US008096476B2

(12) United States Patent
Suzuki

(10) Patent No.: US 8,096,476 B2
(45) Date of Patent: Jan. 17, 2012

(54) ARTICLE SALES DATA PROCESSING APPARATUS

(75) Inventor: Shigeaki Suzuki, Izu (JP)

(73) Assignee: Toshiba Tec Kabushiki Kaisha (JP)

( * ) Notice: Subject to any disclaimer, the term of this patent is extended or adjusted under 35 U.S.C. 154(b) by 687 days.

(21) Appl. No.: 12/218,729

(22) Filed: Jul. 17, 2008

(65) Prior Publication Data

US 2009/0026262 A1 Jan. 29, 2009

(30) Foreign Application Priority Data

Jul. 25, 2007 (JP) ................................. 2007-193565

(51) Int. Cl.
*G06K 7/10* (2006.01)

(52) U.S. Cl. ................................... 235/462.01; 235/385

(58) Field of Classification Search ............. 235/462.01, 235/462.45, 472.1, 383, 385

See application file for complete search history.

(56) References Cited

U.S. PATENT DOCUMENTS

| | | | | |
|---|---|---|---|---|
| 5,532,490 | A * | 7/1996 | Gullberg et al. | 250/363.04 |
| 5,640,002 | A * | 6/1997 | Ruppert et al. | 235/462.46 |
| 6,313,745 | B1 * | 11/2001 | Suzuki | 340/572.1 |
| 6,830,181 | B1 * | 12/2004 | Bennett | 235/440 |
| 6,879,264 | B2 * | 4/2005 | Hidaka et al. | 340/825.19 |
| 7,063,263 | B2 * | 6/2006 | Swartz et al. | 235/472.02 |
| 7,195,157 | B2 * | 3/2007 | Swartz et al. | 235/383 |
| 7,372,360 | B2 * | 5/2008 | Joseph | 340/10.41 |

FOREIGN PATENT DOCUMENTS

| | | |
|---|---|---|
| CN | 1985281 | 6/2007 |
| EP | 1 251 450 | 10/2002 |
| EP | 1 755 093 | 2/2007 |
| JP | 2005-141648 | 6/2005 |
| JP | 2005-339353 | 12/2005 |
| JP | 2006-139395 | 6/2006 |
| WO | 2004-109611 | 12/2004 |

* cited by examiner

*Primary Examiner* — Daniel St. Cyr

(74) *Attorney, Agent, or Firm* — Harness, Dickey & Pierce, P.L.C.

(57) ABSTRACT

An article sales data processing apparatus comprises a first reading unit configured to read an article identification code from a first medium attached to an article, a second reading unit configured to read the article identification code from a second medium attached to the article, a determination unit configured to determine whether the article identification code is the code read by the first reading unit or the code read by the second reading unit, and a control unit configured to separately display, on a display unit, article sales data obtained from the article identification code determined to have been read by the first reading unit and article sales data obtained from the article identification code determined to have been read by the second reading unit.

10 Claims, 8 Drawing Sheets

40

| No. | Article code | Article name | Unit price | Number A | Number B | Number C | Amount |
|---|---|---|---|---|---|---|---|
| 1 | | | | | | | |
| 2 | | | | | | | |
| 3 | | | | | | | |
| 4 | | | | | | | |
| 5 | | | | | | | |
| ⋮ | | | | | | | |
| | | | | ΣA | ΣB | ΣC | Σ amount |

| Article name | Unit price | Number | | | Amount |
|---|---|---|---|---|---|
| AAAA | ¥1,000 | 10 | | | ¥10,000 |
| BBBB | ¥2,000 | 9 | | | ¥18,000 |
| CCCC | ¥3,000 | 8 | | | ¥24,000 |
| | | | | | |
| | | | | | |
| | | | | | |
| | | | | | |
| | Total | 27 | | | ¥52,000 |

FIG.10

| Commodities read by barcodes | | | Commodities read by wireless tags | | |
|---|---|---|---|---|---|
| Article name | Unit price | Number | Article name | Unit price | Number |
| BBBB | ¥2,000 | 1 | AAAA | ¥1,000 | 10 |
| CCCC | ¥3,000 | 8 | BBBB | ¥2,000 | 8 |
| | | | | | |
| | | | | | |
| | | | | | |
| | | | | | |
| | | | | | |
| | Total | 27 | | ¥52,000 | |

FIG.11

| Article name | Unit price | Number | | | Amount |
|---|---|---|---|---|---|
| AAAA (black) | ¥1,000 | 10 | | | ¥10,000 |
| BBBB (red) | ¥2,000 | 9 | | | ¥18,000 |
| CCCC (blue) | ¥3,000 | 8 | | | ¥24,000 |
| | | | | | |
| | | | | | |
| | | | | | |
| | | | | | |
| | Total | 27 | | | ¥52,000 |

FIG. 12

| Article name | Unit price | Number | Number of commodities read by barcodes | Number of commodities read by wireless tags | Amount |
|---|---|---|---|---|---|
| AAAA | ¥1,000 | 10 | 0 | 10 | ¥10,000 |
| BBBB | ¥2,000 | 9 | 1 | 8 | ¥18,000 |
| CCCC | ¥3,000 | 8 | 8 | 0 | ¥24,000 |
| | | | | | |
| | | | | | |
| | | | | | |
| | | | | | |
| | Total | 27 | 8 | 19 | ¥52,000 |

FIG. 13

ARTICLE SALES DATA PROCESSING APPARATUS

CROSS-REFERENCE TO RELATED APPLICATIONS

This application is based upon and claims the benefit of priority from prior Japanese Patent Application No. 2007-193565, filed Jul. 25, 2007, the entire contents of which are incorporated herein by reference.

BACKGROUND OF THE INVENTION

1. Field of the Invention

The present invention relates to an article sales data processing apparatus such as a point of sales (POS) terminal which acquires an article identification code of a sold article from a medium such as a barcode or wireless tag attached to the article and then processes article sales data on the basis of the article identification code.

2. Description of the Related Art

A barcode format is generally employed in a POS system. In the barcode format, a barcode indicating an inherent article identification code is attached to each article. A barcode scanner is connected to a POS terminal. When a barcode of an article purchased by a customer is read by the barcode scanner, the POS terminal obtains an article identification code from the barcode. Then, sales data for the article identified by the article identification code is processed.

In contrast, employment of a wireless tag format has recently been considered in the POS system. In the wireless tag format, a wireless tag is attached to each article. A memory of the wireless tag stores article information such as the article identification code. A wireless tag reader is connected to the POS terminal. When article information is read by the wireless tag reader from the wireless tag attached to an article purchased by a customer, the POS terminal obtains an article identification code from the article information. Then, sales data for the article identified by the article identification code is processed.

In the POS system using the barcode format, an operator has to perform the operation of reading barcodes attached to articles one by one. On the contrary, in the POS system using the wireless tag format, the wireless tag reader can collectively read a plurality of wireless tags. Thus, as compared with the POS system using the barcode format, the POS system using the wireless tag format allows a drastic reduction in processing time required for accounting for one customer.

However, it is extremely difficult in terms of cost, etc. to change an article sales system so that all the articles may be sold with wireless tags attached thereto. Thus, it is anticipated that articles with wireless tags and articles with barcodes are mixedly sold during transition.

In Jpn. Pat. Appln. KOKAI Publication No. 2006-139395, there has been proposed an article sales data processing apparatus adaptable to both the barcode format and the wireless tag format. The apparatus in this publication performs the common processing after obtaining an article identification code from a barcode and after obtaining an article identification code from a wireless tag.

That is, when obtaining an article identification code, the apparatus in this publication processes article sales data on the basis of this article identification code. Then, an article name, unit price, number of items sold, amount, etc. in the article sales data are displayed on a display unit. However, the operator can not recognize from the displayed contents whether the article has been processed in the barcode format or in the wireless tag format.

Articles with wireless tags are generally processed in the wireless tag format. However, the wireless tag is an electronic component. Therefore, when it is broken, data in the wireless tag can not be read by the wireless tag reader. In such a case, it may be processed in the barcode format. In general, a barcode is also attached to an article with a wireless tag.

From the contents displayed on the display unit of the article sales data processing apparatus, the customer and operator are not able to know whether the article has been processed in the barcode format or in the wireless tag format. Therefore, the customer and operator feel anxious that the same article has been processed twice by the wireless tag format and the barcode format.

BRIEF SUMMARY OF THE INVENTION

There has been a demand for an article sales data processing apparatus which makes it possible to know the difference of input formats of article identification codes from the display of article sales data processed on the basis of the article identification codes.

According to one aspect of the present invention, an article sales data processing apparatus comprises: a first reading unit configured to read an article identification code from a first medium attached to an article; a second reading unit configured to read the article identification code from a second medium attached to the article; a determination unit configured to determine whether the article identification code is the code read by the first reading unit or the code read by the second reading unit; and a control unit configured to separately display, on a display unit, article sales data obtained from the article identification code determined to have been read by the first reading unit and article sales data obtained from the article identification code determined to have been read by the second reading unit.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a diagram showing an example of a registration screen in the case where a normal mode is set as an article display mode;

FIG. 11 is a diagram showing an example of the registration screen in the case where a region division mode is set as an article display mode;

FIG. 12 is a diagram showing an example of the registration screen in the case where an attribute division mode is set as an article display mode; and FIG. 13 is a diagram showing an example of the registration screen in the case where a number division mode is set as an article display mode.

DETAILED DESCRIPTION OF THE INVENTION

A best mode for carrying out the present invention will hereinafter be described.

It is to be noted that this embodiment concerns a case where the present invention is applied to a POS terminal adapted to both a barcode format and a wireless tag format.

Figure 1:
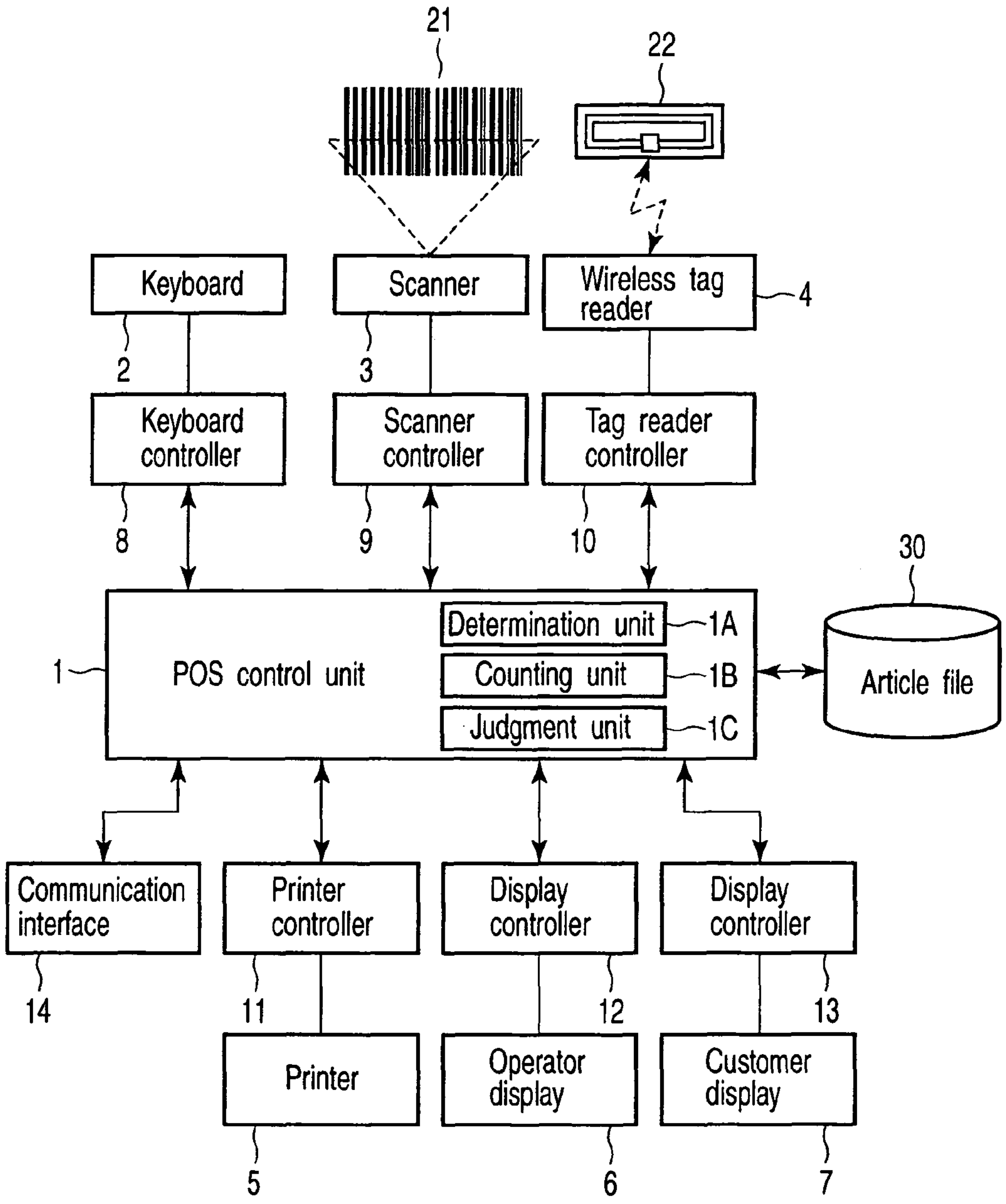
FIG. 1 is a block diagram showing the configuration of essential parts of a POS terminal which is one embodiment of the present invention.

The configuration of the POS terminal in the present embodiment is described using a block diagram in FIG. 1. The POS terminal is equipped with a POS control unit 1 comprising a CPU, ROM, RAM, etc. The POS terminal also comprises various input/output devices such as a keyboard 2, a barcode scanner 3, a wireless tag reader 4, a printer 5, an operator display 6 and a customer display 7, their controllers 8 to 13, and a communication interface 14. The controllers 8 to 13 and the communication interface 14 are connected to the POS control unit 1.

The keyboard 2 is provided with various keys necessary for article sales registration, such as numeric keys, a subtotal key, a checkout key, etc. The barcode scanner 3 optically read a barcode 21 attached to an article. The wireless tag reader 4 reads, by radio in a noncontact manner, data stored in a memory of a wireless tag 22 attached to the article. The printer 5 prints a receipt. The operator display 6 displays article sales data, transaction total data, etc. to an operator of the POS terminal called a cashier. The customer display 7 displays the article sales data, the transaction total data, etc. to a customer.

Figure 2:
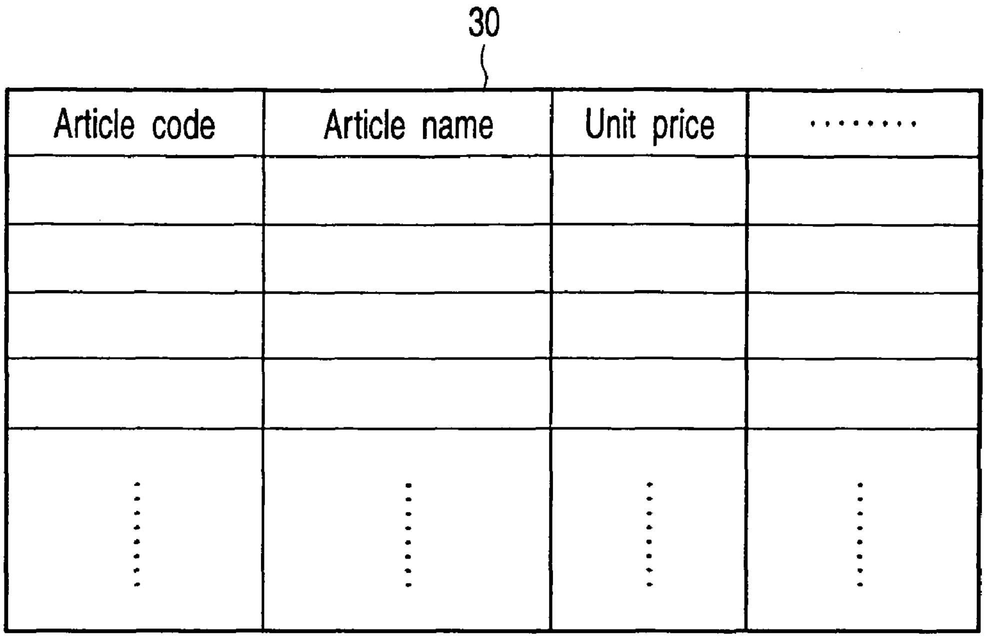
FIG. 2 is a diagram showing a data structure of an article file.

The POS terminal is equipped with an article file 30. As shown in FIG. 2, article data such as an article name, unit price, etc. are preset in the article file 30 to correspond to an article code for identifying each article.

When an article code is input, the POS control unit 1 searches the article file 30 to load article data corresponding to the article code. The POS control unit 1 then processes article sales data on the basis of this article data.

The article file 30 may be installed in an external computer connected via the communication interface 14. In this case, the POS control unit 1 accesses the article file 30 via the communication interface 14.

Formats to input article codes to the POS control unit 1 include the barcode format and the wireless tag format. The POS terminal in the present embodiment is adapted to the two formats including the barcode format and the wireless tag format.

Figure 3:
FIG. 3 is a diagram showing the structure of article data provided to a POS controller from a scanner controller.

In the barcode format, an article code is input from the barcode 21 read by the barcode scanner 3. The barcode 21 attached to the article contains the article code to identify the article. When the barcode 21 is scanned and read with the barcode scanner 3, data in the barcode 21 is sent to a scanner controller 9. The scanner controller 9 analyzes the data in the barcode 21 to obtain the article code. Having obtained the article code, the scanner controller 9 attaches a predetermined identifier F0 to the article code, as shown in FIG. 3. The article code with the identifier F0 is then provided to the POS control unit 1.

Figure 4:
FIG. 4 is a diagram showing the structure of article data provided to the POS controller from a tag reader controller.

In the wireless tag format, an article code is input from memory data in the wireless tag 22 read by the wireless tag reader 4. The article code to identify at least the article is stored in the memory of the wireless tag 22 attached to this article. When the wireless tag 22 is read by the wireless tag reader 4, tag data therein is sent to a tag reader controller 10. The tag reader controller 10 analyzes the tag data to obtain the article code. Having obtained the article code, the tag reader controller 10 attaches a predetermined identifier F1 to the article code, as shown in FIG. 4. The article code with the identifier F1 is then provided to the POS control unit 1.

The barcode scanner 3 and the scanner controller 9 constitute a first reading unit for reading the article code from a first medium, that is, the barcode 21 attached to the article. The wireless tag reader 4 and the tag reader controller 10 constitute a second reading unit for reading the article code from a second medium, that is, the wireless tag 22 attached to the article.

In addition, the functions of the scanner controller 9 and the tag reader controller 10 to attach the different identifiers F0, F1 to the article codes and provide them to the POS control unit 1 are achieved by driver software. It should be understood that the wireless tag reader 4 may be a wireless tag reader/writer capable of writing data into the wireless tag 22 in a noncontact manner.

The POS control unit 1 has a function as a determination unit 1A, a function as a counting unit 1B and a function as a judgment unit 1C. The determination unit 1A determines whether an article identification code is the code read by the first reading unit or the code read by the second reading unit. The counting unit 1B separately counts the number of article sales data for each article, wherein the number of article sales data includes a first number which is the number of article sales data obtained from the article identification code determined to have been read by the first reading unit, and a second number which is the number of article sales data obtained from the article identification code determined to have been read by the second reading unit. The judgment unit 1C judges for each article whether the first number and the second number counted in the counting unit 1B are "0" or are greater than or equal to "1".

Figures 5, 6:
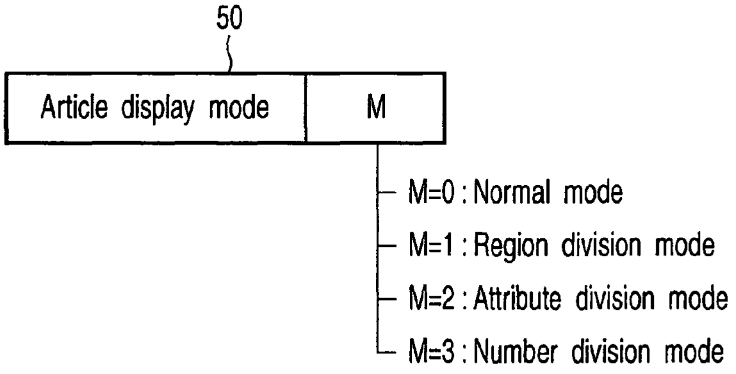
FIG. 5 is a diagram showing a data structure of an article registration table formed in a memory of the POS terminal.
FIG. 6 is a diagram showing a data structure of a display mode setting table formed in the memory of the POS terminal.

In POS terminal having such a configuration, an article registration table 40 shown in FIG. 5 and a display mode setting table 50 shown in FIG. 6 are formed in the memory incorporated in the POS control unit 1.

The article registration table 40 stores sales data and total data for articles purchased by one customer. The article sales data includes an article code, article name, unit price, number of items sold and amount sold. A storage area for the number of items sold is divided into three areas: a number A, number B and number C. The number A area stores the total number of articles read by the barcode scanner 3 and articles read by the wireless tag reader 4. The number B area stores the number of articles read by the barcode scanner 3. The number C area stores the number of articles read by the wireless tag reader 4.

The display mode setting table 50 stores an article display mode M for specifying a display format for an article registration screen on the operator display 6 and the customer display 7. The article display mode M includes four modes: a normal mode, a region division mode, an attribute division mode and a number division mode. In the present embodiment, the normal mode is specified by data "0". The region division mode is specified by data "1". The attribute division mode is specified by data "2". The number division mode is specified by data "3". The display format of each mode is described later.

Figure 7:
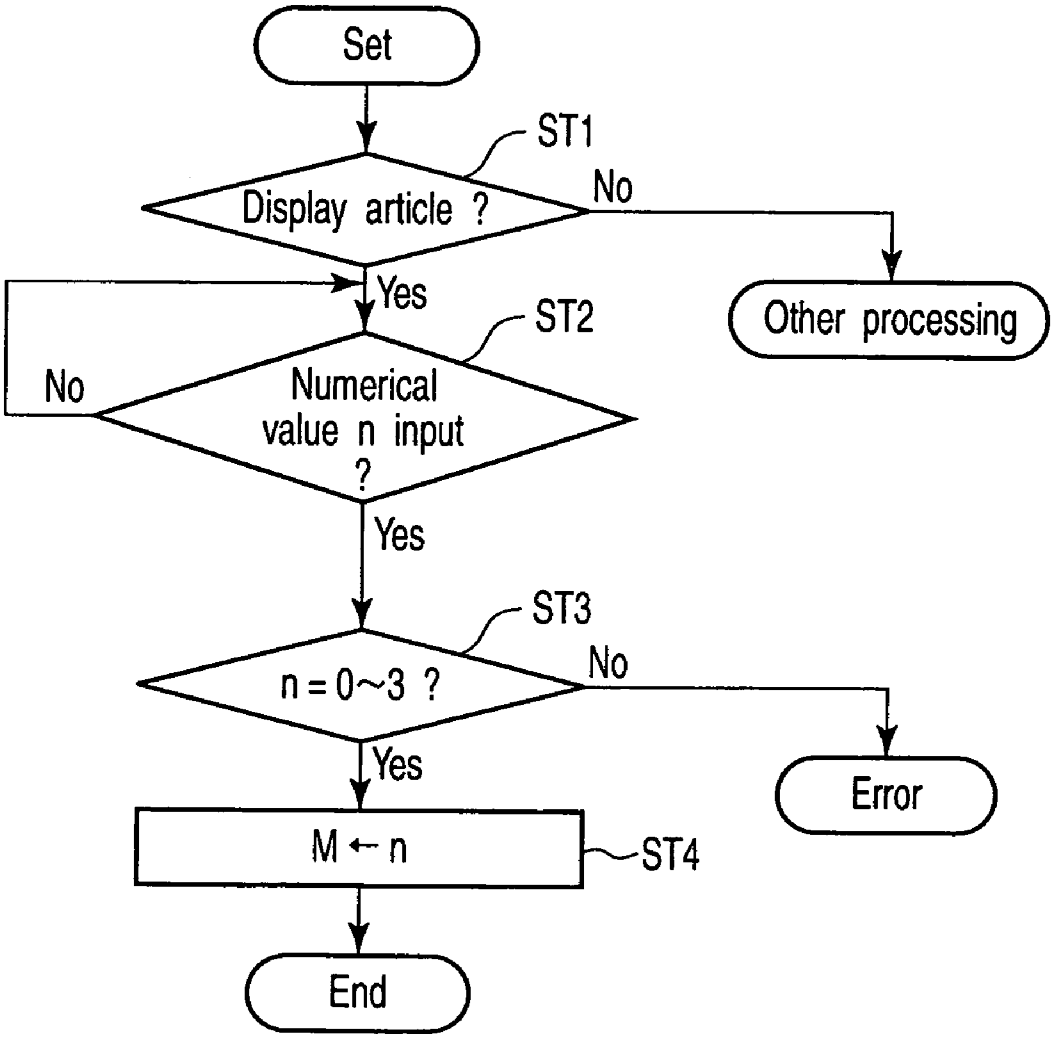
FIG. 7 is a flowchart showing a procedure of article display mode setting processing performed by the POS controller.

The operator of the POS terminal can set a desired article display mode M in the display mode setting table 50. A procedure for setting this article display mode M is described using a flowchart in FIG. 7.

When power is turn on, the POS terminal is in an idle state which permits the selection of various job menus. In this idle state, the operator operates the keyboard 2 to select an article display mode setting job. Then, the POS control unit 1 starts processing shown in the flowchart of FIG. 7.

First, in step ST1, the POS control unit 1 judges whether the article display mode setting job has been selected. Having ascertained that the article display mode setting job has been selected, the POS control unit 1 waits in step ST2 for a numerical value n to be input. When the numeric keys of the keyboard 2 are operated and the numerical value n is input, the POS control unit 1 judges in step ST3 whether the numerical value n is any of "0" to "3" valid as the article display mode M. When a numerical value n other than "0" to "3" is input, the key input is an error.

When a numerical value n of any of "0" to "3" is input, the POS control unit 1 stores the numerical value n in the display mode setting table 50 as the article display mode M, in step ST4. Thereafter, the POS terminal returns to the idle state.

Therefore, when setting the normal mode as the article display mode M, the operator can input the numerical value "0". When setting the region division mode, the operator can input the numerical value "1". When setting the attribute division mode, the operator can input the numerical value "2". When setting the number division mode, the operator can input the numerical value "3".

Figure 8:
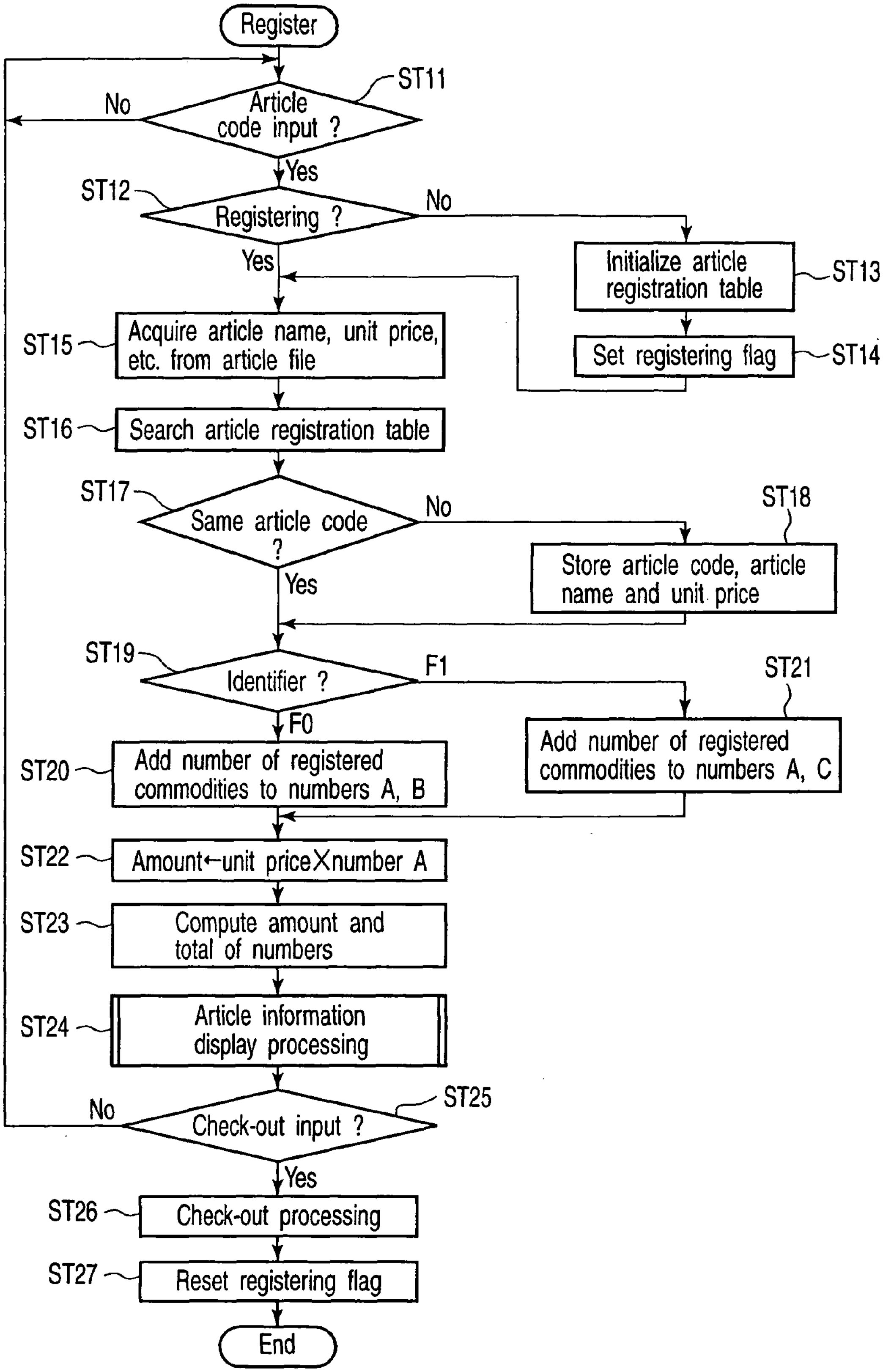
FIG. 8 is a flowchart showing a procedure of article registration processing performed by the POS controller.

Next, a procedure for registering articles purchased by one customer is described. The operator called a cashier who performs the operation of registering articles operates the keyboard 2 of the POS terminal in the idle state to select an article registration job. Then, the POS control unit 1 starts processing shown in a flowchart of FIG. 8.

The POS control unit 1 waits in step ST11 for an article code to be input. When the article code is input, the POS control unit 1 judges in step ST12 whether a registering flag has been set. The registering flag is set when the registration of articles purchased by one customer is started, and the registering flag is reset when the registration terminates. Since the registering flag is reset when the first article is registered, the POS control unit 1 initializes the article registration table 40 in step ST13. Moreover, the registering flag is set in step ST14. Since the registering flag is set when the second and following articles are registered, the POS control unit 1 does not execute processing in step ST13 and step ST14.

When the registering flag is set in step ST14 or when the registering flag has already been set in step ST12, the POS control unit 1 searches the article file 30 for the input article code in step ST15. Then, article data such as an article name, unit price, etc. stored in accordance with this article code is loaded.

Having acquired the article data, the POS control unit 1 searches the article registration table 40 for the input article code in step ST16. The POS control unit 1 then judges in step ST17 whether the same article code is stored in the article registration table 40. When the same article code is not stored, the POS control unit 1 stores the input article code as well as the article name and unit price loaded from the article file 30 in association with a new table number (No), in step ST18. When the same article code is stored, the POS control unit 1 does not execute processing in step ST18.

Then, in step ST19, the POS control unit 1 determines an identifier added to the input article code (the determination unit 1A).

When the identifier is "F0", the input article code has been read by the barcode scanner 3. In this case, the POS control unit 1 searches the article registration table 40 for the input article code in step ST20. The POS control unit 1 then adds the number of articles sold to the number A area and the number B area of a table number at which the same article code is stored (the counting unit 1B).

When the identifier is "F1", the input article code has been read by the wireless tag reader 4. In this case, the POS control unit 1 searches the article registration table 40 for the input article code in step ST21. The POS control unit 1 then adds the number of articles sold to the number A area and the number C area of a table number at which the same article code is stored (the counting unit 1B).

It should be understood that the number of articles sold is "n" when numerical data n has been input via the keyboard 2 immediately before the input of the article code, and the number of articles sold is "1" when no numerical data is input.

In step ST22, the POS control unit 1 multiplies a value in the unit price area by a value in the number A area for each table number in the article registration table 40 to compute an amount. Then, this amount is stored in an amount area of the same table number.

In step ST23, the POS control unit 1 sums the values in the number A area, number B area, number C area and amount area of the article registration table 40. Then, the sum value is stored in a sum area.

In step ST24, the POS control unit 1 executes processing of displaying article information on the operator display 6 and the customer display 7. This display processing is described later.

When the article information display processing is finished, the POS control unit 1 then judges in step ST25 whether a closure input has been performed. When the registration of the articles purchased by one customer is finished, the cashier depresses a checkout key in the keyboard 2. When the checkout key is not input, the POS control unit 1 judges that no closure input has been performed. In this case, the POS control unit 1 returns to the processing in step ST11. The POS control unit 1 waits for the next article code to be input.

When the checkout key has been input, the POS control unit 1 judges that a closure input has been performed. In this case, the POS control unit 1 executes registration closure processing in step ST26. The registration closure processing includes processing such as the adjustment of an account, the issuance of a receipt, etc. After having finished the registration closure processing, the POS control unit 1 resets the registering flag in step ST27. Once the registering flag is reset, the POS terminal returns to the idle state.

Figure 9:
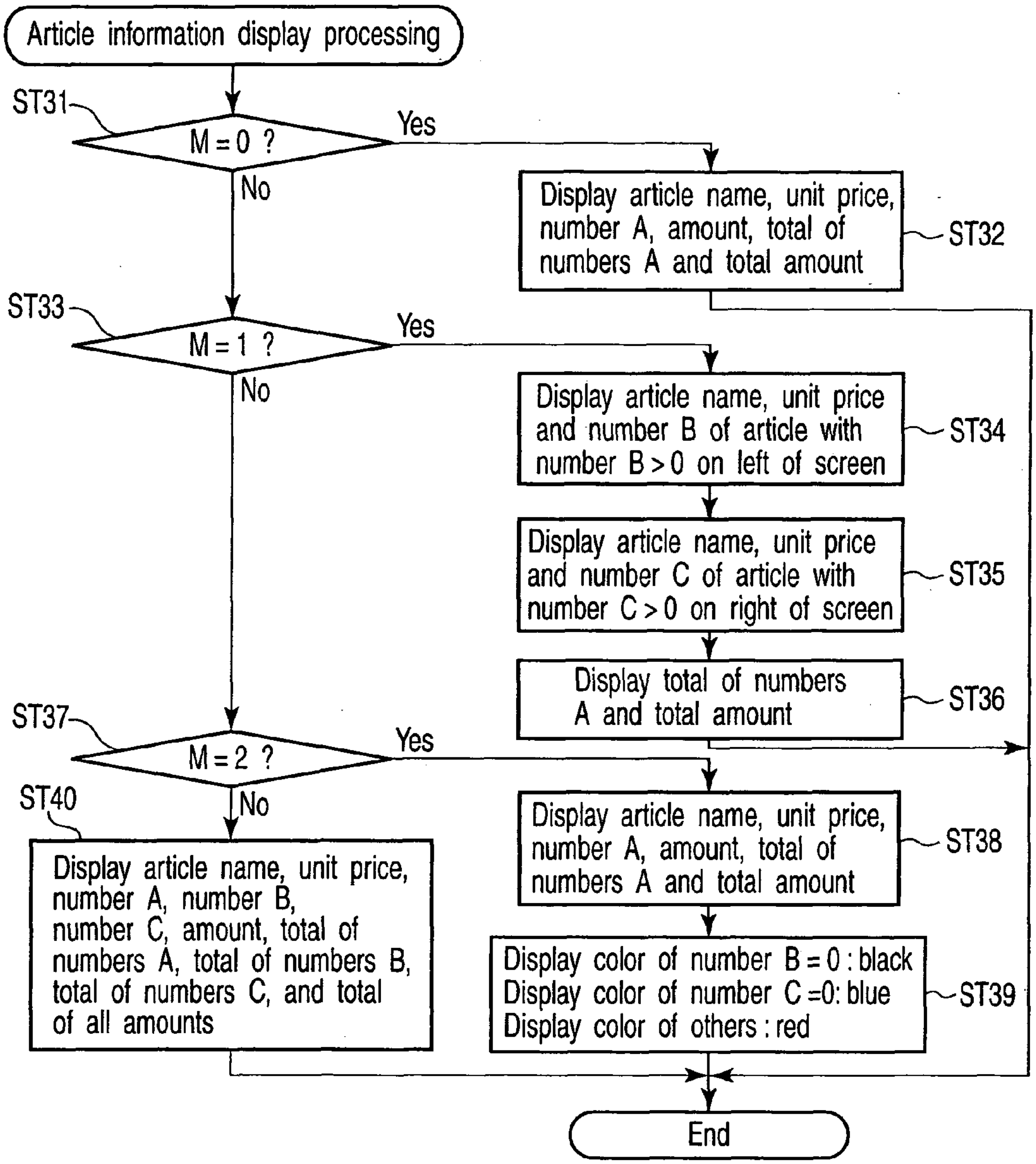
FIG. 9 is a flowchart specifically showing a procedure of article information display processing in FIG. 8.

The article information display processing is described using a flowchart in FIG. 9. The POS control unit 1 checks the article display mode M set in the display mode setting table 50.

When the value of the display mode setting table 50 is “0” (YES in step ST31), the normal mode is set as the article display mode M. In this case, in step ST32, the POS control unit 1 reads data including an article name, unit price, number A and amount in the order of table number from the article registration table 40. The POS control unit 1 also reads total data in the number A area and total data in the amount area. Then, the data read from the article registration table 40 are displayed on the registration screens of the operator display 6 and the customer display 7.

When the value of the display mode setting table 50 is “1” (YES in step ST32), the region division mode is set as the article display mode M. In this case, in step ST34, the POS control unit 1 checks a value in the number B area in the order of table number of the article registration table 40. The POS control unit 1 then judges whether the value in the number B area is “0” or is greater than or equal to “1” (the judgment unit 1C). When the value in the number B area is greater than or equal to “1”, the POS control unit 1 reads the article name, unit price, number B corresponding to the table number of that area. Then, the data read from the article registration table 40 are displayed in the left-hand regions of the registration screens of the operator display 6 and the customer display 7.

Furthermore, in step ST35, the POS control unit 1 checks a value in the number C area in the order of table number of the article registration table 40. Then, it is judged whether the value in the number C area is “0” or is greater than or equal to “1” (the judgment unit 1C). When the value in the number C area is greater than or equal to “1”, the POS control unit 1 reads the article name, unit price, number C corresponding to the table number of that area. Then, the data read from the article registration table 40 are displayed in the right-hand regions of the registration screens of the operator display 6 and the customer display 7.

Moreover, in step ST36, the POS control unit 1 reads the total data in the number A area and the total data in the amount area from the article registration table 40. Then, the total data are displayed on the lowermost lines of the registration screens of the operator display 6 and the customer display 7.

When the value of the display mode setting table 50 is “2” (YES in step ST37), the attribute division mode is set as the article display mode M. In this case, in step ST38, the POS control unit 1 reads data including an article name, unit price, number A, number B, number C and amount in the order of table number from the article registration table 40. The POS control unit 1 also reads total data in the number A area and total data in the amount area. Then, out of the data read from the article registration table 40, the data except for the data read from the number B area and the number C are displayed on the registration screens of the operator display 6 and the customer display 7.

At this point, the POS control unit 1 then judges, in step ST39, whether the values in the number B area and the number C area are “0” or are greater than or equal to “1” (the judgment unit 1C). For the data corresponding to the table number in which the value in the number B area is “0”, a first color (black) is used as a character color which is one kind of display attributes. For the data corresponding to the table number in which the value in the number C area is “0”, a second color (blue) is used as a character color. For the data corresponding to the table number in which the values in the number B area and the number C area are both greater than or equal to “1”, a third color (red) is used.

When the value of the display mode setting table 50 is “3” (NO in step ST37), the number division mode is set as the article display mode M. In this case, in step ST40, the POS control unit 1 reads data including the article name, unit price, number A, number B, number C and amount in the order of table number from the article registration table 40. The POS control unit 1 also reads total data in the number A area, number B area and number C area, and total data in the amount area. Then, the data read from the article registration table 40 are displayed on the registration screens of the operator display 6 and the customer display 7.

A case is shown as an example in which one customer purchases ten articles [AAAA] at a unit price of 1000 yen, nine articles [BBBB] at a unit price of 2000 yen, and eight articles [CCCC] at a unit price of 3000 yen. In addition, both the barcodes 21 and the wireless tags 22 are attached to the articles [AAAA] and the articles [BBBB], and the barcodes 21 alone are attached to the articles [CCCC].

In this case, the cashier registers the articles [AAAA] and the articles [BBBB] by reading the data in the wireless tags 22 with the wireless tag reader 4, and registers the articles [CCCC] by reading the barcodes 21 with the scanner 3.

Assume that all the wireless tags attached to the articles [AAAA] and the articles [BBBB] are normal. In this case, when the registration of a total of 27 articles is completed, sales data for ten articles [AAAA], sales data for nine articles [BBBB] and sales data for eight articles [CCCC] are processed. As a result, the data for ten articles [AAAA], the data for nine articles [BBBB] and the data for eight articles [CCCC] are displayed on the registration screens of the operator display 6 and the customer display 7.

Assume that one of the wireless tags attached to the articles [BBBB] is broken. In this case, even if the cashier thinks that the registration of a total of 27 articles has been completed, sales data for eight articles [BBBB] alone are registered. At this point, “8” is displayed as the number of articles [BBBB] on the registration screens of the operator display 6 and the customer display 7. The cashier can thus recognize that the wireless tag 22 attached to any one of the articles [BBBB] is broken.

Having recognized that the wireless tag 22 is broken, the cashier selects any one of the articles [BBBB]. As the common article code is used for all of the articles [BBBB], it is not necessary to find the article [BBBB] to which the broken wireless tag 22 is attached. The cashier causes the barcode 21 attached to the selected article [BBBB] to be read by the scanner 3, and thus registers one article [BBBB]. In this manner, the registration of a total of 27 articles purchased by the customer is completed.

Now, in FIG. 10, there is shown an example of a display screen on the operator display 6 and the customer display 7 when the normal mode is set at the completion of the registration of 27 articles. There are also shown an example of a display screen when the region division mode is set in FIG. 11, an example of a display screen when the attribute division mode is set in FIG. 12, and an example of a display screen when the number division mode is set in FIG. 13.

The normal mode is a conventional display pattern. As apparent from FIG. 10, it is unclear whether each article has been registered in the barcode format or the wireless tag format.

The region division mode is a first display pattern according to the present invention. This display pattern makes it possible to know at a glance that ten articles [AAAA] and eight articles [BBBB] have been registered in the wireless tag format and that one article [BBBB] and eight articles [CCCC] have been registered in the barcode format.

The attribute division mode is a second display pattern according to the present invention. This display pattern makes it possible to know that a total of ten articles [AAAA] whose character color is black have been registered in the wireless tag format, that a total of eight articles [CCCC] whose character color is blue have been registered in the barcode format and that a total of nine articles [BBBB] whose character color is red have been registered in the barcode format and the wireless tag format. In the case of the attribute division mode, the number of articles registered in the barcode format and the number of articles registered in the wireless tag format are not known, but it is possible to easily recognize which article has been registered in which format.

The number division mode is a third display pattern according to the present invention. This display pattern makes it possible to know at a glance that a total of ten articles [AAAA] have been registered in the wireless tag format, that one of a total of nine articles [BBBB] has been registered in the barcode format and the remaining eight articles have been registered in the wireless tag format, and that a total of eight articles [CCCC] have been registered in the barcode format.

Thus, according to the present embodiment, the region division mode, the attribute division mode or the number division mode is selected as the article display mode, such that the cashier and the customer can easily recognize whether an article has been registered in the barcode format or the wireless tag format. Therefore, for example, when the same article is reregistered because its wireless tag 22 is broken, the display contents for the article registered in the wireless tag format are distinguished from the display contents for the article registered in the wireless tag format. As a result, it is clear that there are no double registrations. Moreover, there is no omission of the registration of an article.

In particular, when the region division mode or the number division mode is selected, even the number of articles registered in the barcode format and the number of articles registered in the wireless tag format are clear. This brings a great advantage.

In addition, this invention is not directly limited to the embodiment described above, and the components can be modified and embodied at the stage of carrying out the invention without departing from the spirit thereof.

For example, in the embodiment described above, the present invention is applied to an article sales data processing apparatus adapted to two article code reading formats including the barcode format and the wireless tag format, but the article code reading formats are not limited to the two formats. Moreover, the present invention may be applied to an apparatus adapted to three or more article code reading formats.

Furthermore, in the embodiment described above, different character colors are used to make a distinction when the article display mode M is “2”, that is, the attribute division mode, but other character attributes such as character sizes may be different to make a distinction. Moreover, character decorations may be different to make a distinction.

Still further, three modes including the region division mode, the attribute division mode and the number division mode are provided as the article display modes in addition to the normal mode in the case shown in the embodiment described above, but at least one of these three modes has only to be provided.

Further yet, the screens displayed on the operator display 6 and the customer display 7 are the same in the embodiment described above, the contents of the screens on the operator display 6 and the customer display 7 may be different. For example, this can be archived if the display mode setting table 50 is divided into an article display mode area for the operator display 6 and an article display mode area for the customer display 7 and arbitrary article display modes can be set in the respective areas.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An article sales data processing apparatus configured to acquire article sales data for an article identified by an article identification code and display the article sales data on a display unit, the apparatus comprising:

a first reading unit configured to read the article identification code from a first medium attached to the article;

a second reading unit configured to read the article identification code from a second medium attached to the article;

a counting unit configured to separately count the number of the article sales data for each article, the number of the article sales data including a first number which is the number of the article sales data obtained from the article identification code read by the first reading unit, and a second number which is the number of the article sales data obtained from the article identification code read by the second reading unit; and a control unit configured to perform a region division mode to divide a screen of the display unit, and display, in one region of the divided screen, a first article name and the first number of the article identified by the article identification code read by the first reading unit, and, in another region of the divided screen, a second article name and the second number of the article identified by the article identification code read by the second reading unit.

2. The article sales data processing apparatus according to claim 1, further comprising:

a determination unit configured to determine whether the article identification code is the code read by the first reading unit or the code read by the second reading unit; wherein the first reading unit outputs the article identification code read from the first medium to the determination unit after adding a first identifier thereto, the second reading unit outputs the article identification code read from the second medium to the determination unit after adding a second identifier different from the first identifier thereto, and the determination unit determines, by the identifier added to the article identification code by the first or second reading unit, whether the article identification code is the code read by the first reading unit or the code read by the second reading unit.

3. The article sales data processing apparatus according to claim 1, wherein the first reading unit is configured to read the article identification code from a barcode attached to the article, and the second reading unit is configured to read the article identification code from a wireless tag attached to the article.

4. The article sales data processing apparatus according to claim 1, further comprising:

a mode setting unit configured to set one of the region division mode and an attribute division mode as an article display mode, wherein when the article display mode set in the mode setting unit is the region division mode, the control unit performs the region division mode, and when the article display mode set in the mode setting unit is the attribute division mode, the control unit causes at least one display attribute to be different from other display attributes, the display attributes including a first display attribute of the article identifiable by the article identification code read by the first reading unit and unidentifiable by the article identification code read by the second reading unit, a second display attribute of the article identifiable by the article identification code read by the second reading unit and unidentifiable by the article identification code read by the first reading unit, and a third display attribute of the article identifiable by the article identification code read by the first reading unit and also identifiable by the article identification code read by the second reading unit.

5. The article sales data processing apparatus according to claim 1, further comprising:

a mode setting unit configured to set one of the region division mode and a number division mode as an article display mode, wherein when the article display mode set in the mode setting unit is the region division mode, the control performs the region division mode, and when the article display mode set in the mode setting unit is the number division mode, the control unit divides the screen of the display unit into a region of the first and second article names, a region of the first number, and a region of the second number, and displays, in the region of the first and second article names, the first and second article names identified by the article identification code read by either the first reading unit or the second reading unit, wherein, for each article, in a case where the article identification code of the article is read by the first reading unit, the first number of the article is displayed in the region of the first number, and in a case where the article identification code of the article is read by the second reading unit, the second number of the article is displayed in the region of the second number.

6. An article sales data processing apparatus configured to acquire article sales data for an article identified by an article identification code and display the article sales data on a display unit, the apparatus comprising:

a first reading unit configured to read the article identification code from a first medium attached to the article;

a second reading unit configured to read the article identification code from a second medium attached to the article;

a counting unit configured to separately count the number of the article sales data for each article, the number of the article sales data including a first number which is the number of the article sales data obtained from the article identification code read by the first reading unit, and a second number which is the number of the article sales data obtained from the article identification code read by the second reading unit; and a control unit configured to perform a number division mode to divide a screen of the display unit into a region of an article name, a region of the first number, and a region of the second number, and display, in the region of the article name, the article name of the article identified by the article identification code read by the first reading unit and the article name of the article identified by the article identification code read by the second reading unit, wherein for each article, in a case where the article identification code of the article is read by the first reading unit, the first number of the article is displayed in the region of the first number, and in a case where the article identification code of the article is read by the second reading unit, the second number of the article is displayed in the region of the second number.

7. The article sales data processing apparatus according to claim 6, further comprising:

a mode setting unit configured to set one of an attribute division mode and the number division mode as an article display mode, wherein when the article display mode set in the mode setting unit is the attribute division mode, the control unit causes at least one display attribute to be different from other display attributes, the display attributes including a first display attribute of the article identifiable by the article identification code read by the first reading unit and unidentifiable by the article identification code read by the second reading unit, a second display attribute of the article identifiable by the article identification code read by the second reading unit and unidentifiable by the article identification code read by the first reading unit, and a third display attribute of the article identifiable by the article identification code read by the first reading unit and also identifiable by the article identification code read by the second reading unit, and when the article display mode set in the mode setting unit is the number division mode, the control unit performs the number division mode.

8. An article sales data processing apparatus configured to acquire article sales data for an article identified by an article identification code and display the article sales data on a display unit, the apparatus comprising:

a first reading unit configured to read the article identification code from a first medium attached to the article;

a second reading unit configured to read the article identification code from a second medium attached to the article;

a counting unit configured to separately count the number of the article sales data for each article, the number of the article sales data including a first number which is the number of the article sales data obtained from the article identification code read by the first reading unit, and a second number which is the number of the article sales data obtained from the article identification code read by the second reading unit; and a control unit configured to perform an attribute division mode to cause at least one display attribute to be different from other display attributes, the display attributes including a first display attribute of the article identifiable by the article identification code read by the first reading unit and unidentifiable by the article identification code read by the second reading unit, a second display attribute of the article identifiable by the article identification code read by the second reading unit and unidentifiable by the article identification code read by the first reading unit, and a third display attribute of the article identifiable by the article identification code read by the first reading unit and also identifiable by the article identification code read by the second reading unit.

9. The article sales data processing apparatus according to claim 8, wherein each of the first through third display attributes is a character color.

10. The article sales data processing apparatus according to claim 8, wherein each of the first through third display attributes is a character size.

* * * * *